(12) United States Patent
Chavez

(10) Patent No.: US 12,172,560 B2
(45) Date of Patent: Dec. 24, 2024

(54) VEHICLE SEAT COVER

(71) Applicant: Casey Chavez, Rancho Cucamonga, CA (US)

(72) Inventor: Casey Chavez, Rancho Cucamonga, CA (US)

( * ) Notice: Subject to any disclaimer, the term of this patent is extended or adjusted under 35 U.S.C. 154(b) by 184 days.

(21) Appl. No.: 18/092,717

(22) Filed: Jan. 3, 2023

(65) Prior Publication Data
US 2023/0150406 A1 May 18, 2023

Related U.S. Application Data

(63) Continuation-in-part of application No. 17/234,652, filed on Apr. 19, 2021, now abandoned.

(60) Provisional application No. 63/011,948, filed on Apr. 17, 2020.

(51) Int. Cl.
| | |
|---|---|
| *B60N 2/60* | (2006.01) |
| *B32B 27/08* | (2006.01) |
| *B32B 27/40* | (2006.01) |

(52) U.S. Cl.
CPC ............ *B60N 2/6027* (2013.01); *B32B 27/08* (2013.01); *B32B 27/40* (2013.01); *B32B 2250/24* (2013.01); *B32B 2250/40* (2013.01); *B32B 2255/10* (2013.01); *B32B 2270/00* (2013.01); *B32B 2274/00* (2013.01); *B32B 2307/726* (2013.01); *B32B 2307/7265* (2013.01); *B32B 2601/00* (2013.01)

(58) Field of Classification Search
CPC ... B60N 2/6027; B60N 2/6063; B60N 2/6036
See application file for complete search history.

(56) References Cited

U.S. PATENT DOCUMENTS

| | | | | |
|---|---|---|---|---|
| 5,265,933 | A * | 11/1993 | Croshaw | B60N 2/6063 297/229 |
| 2013/0088054 | A1* | 4/2013 | Atchison | B60N 2/6063 297/228.11 |
| 2018/0147963 | A1* | 5/2018 | Kim-Perek | B60N 2/6036 |

* cited by examiner

*Primary Examiner* — Anthony D Barfield
(74) *Attorney, Agent, or Firm* — Omni Legal Group; Omid E. Khalifeh; Ariana K Santoro

(57) ABSTRACT

An automotive seat cover made from a three-layer laminated elastic material having a first outer moisture-wicking antimicrobial layer, an interior waterproof layer, and a second outer moisture-wicking antimicrobial layer.

3 Claims, 7 Drawing Sheets

VEHICLE SEAT COVER

CROSS-REFERENCE TO RELATED APPLICATIONS

This application claims the benefit of priority under 35 U.S.C. § 120 from U.S. patent application Ser. No. 17/234,652, filed Apr. 19, 2021 and entitled VEHICLE SEAT COVER, which itself claims the benefit of priority under 35 U.S.C. § 119(e) from U.S. Patent Application No. 63/011,948, filed Apr. 17, 2020, now abandoned and entitled SEAT COVER AND COVER MATERIAL. The disclosures of the foregoing application are incorporated herein by reference in their entirety.

GOVERNMENT CONTRACT

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

BACKGROUND

Removable seat covers for vehicles are extensively used to protect permanent seat upholstery, provide a more decorative appearance, and/or to hide unattractive or damaged upholstery in cars, trucks, bicycles, and other vehicles. They are also useful for enhancing a seat's comfort, for example to reduce sweating or to provide insulation for vinyl or leather seats. They are also useful for reducing wear and tear on vehicle seats.

Many different seat cover designs have been proposed, including different cover solutions for high back seats, low back seats, and seats with and without headrests. A variety of materials are used in such seat covers, including stretchable fabrics, synthetic materials, sheepskin, and wool.

Figure 1:
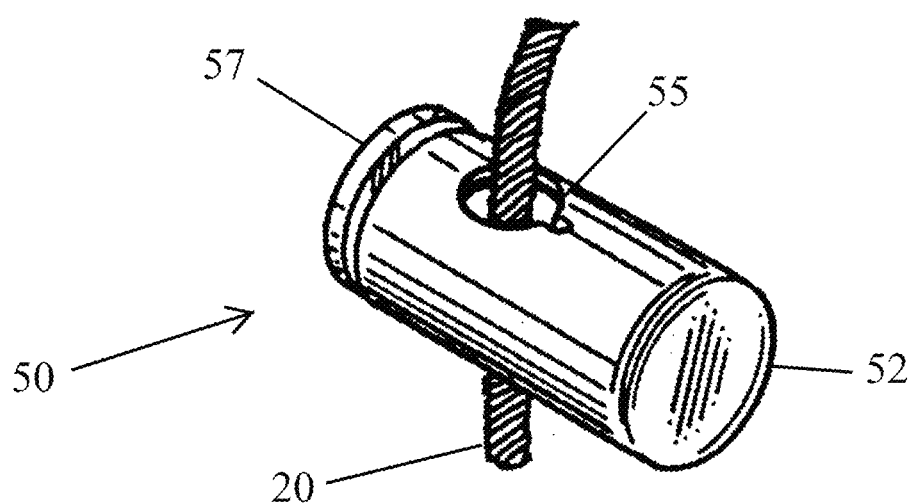
FIG. 1 is a perspective view of a cord lock and cord.
Figure 2:
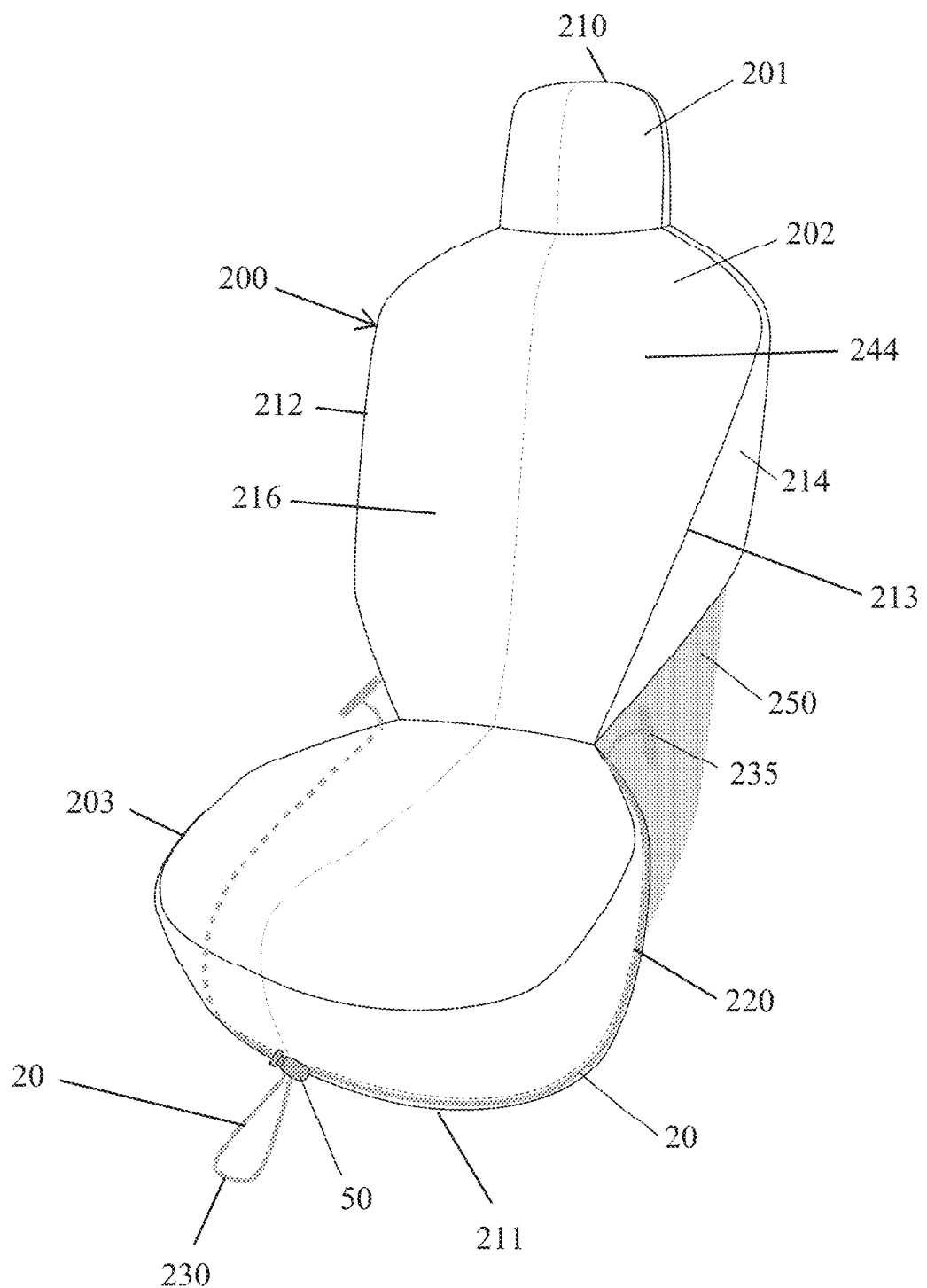
FIG. 2 is a perspective view of an embodiment of the present car seat cover on a car seat.
Figure 3:
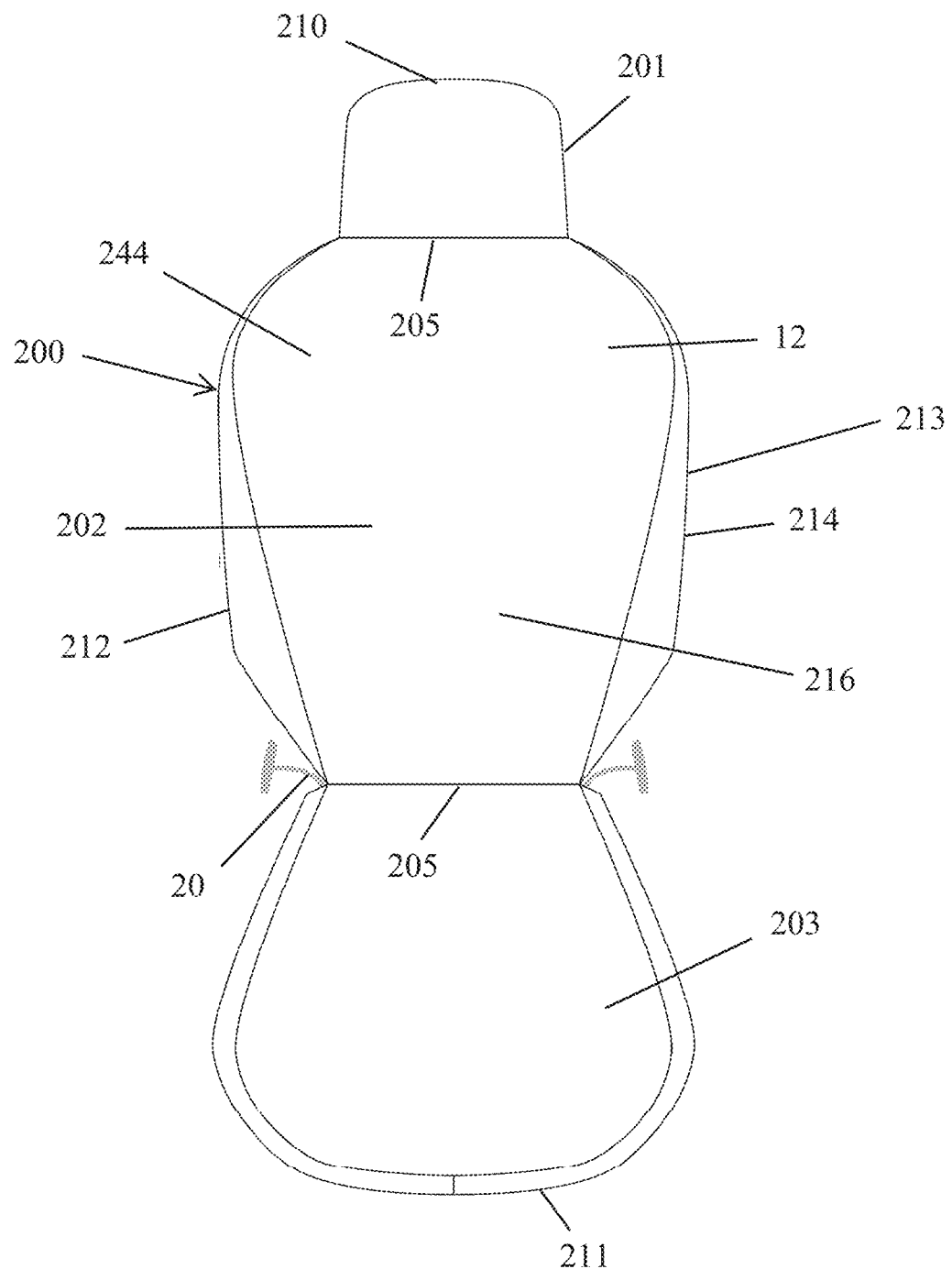
FIG. 3 is a front view of the car seat and cover of FIG. 2.
Figure 4:
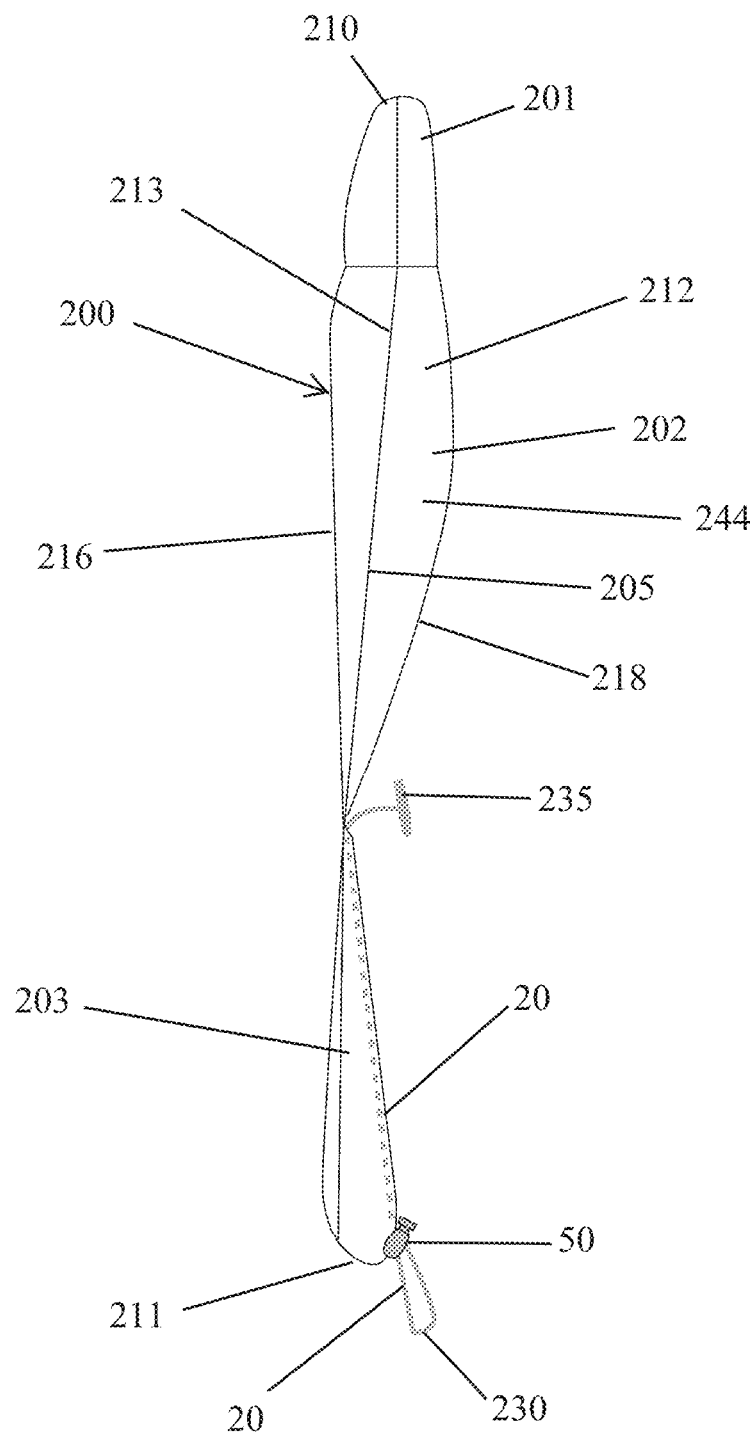
FIG. 4 is a side view of the car seat and cover of FIG. 2.
Figure 5:
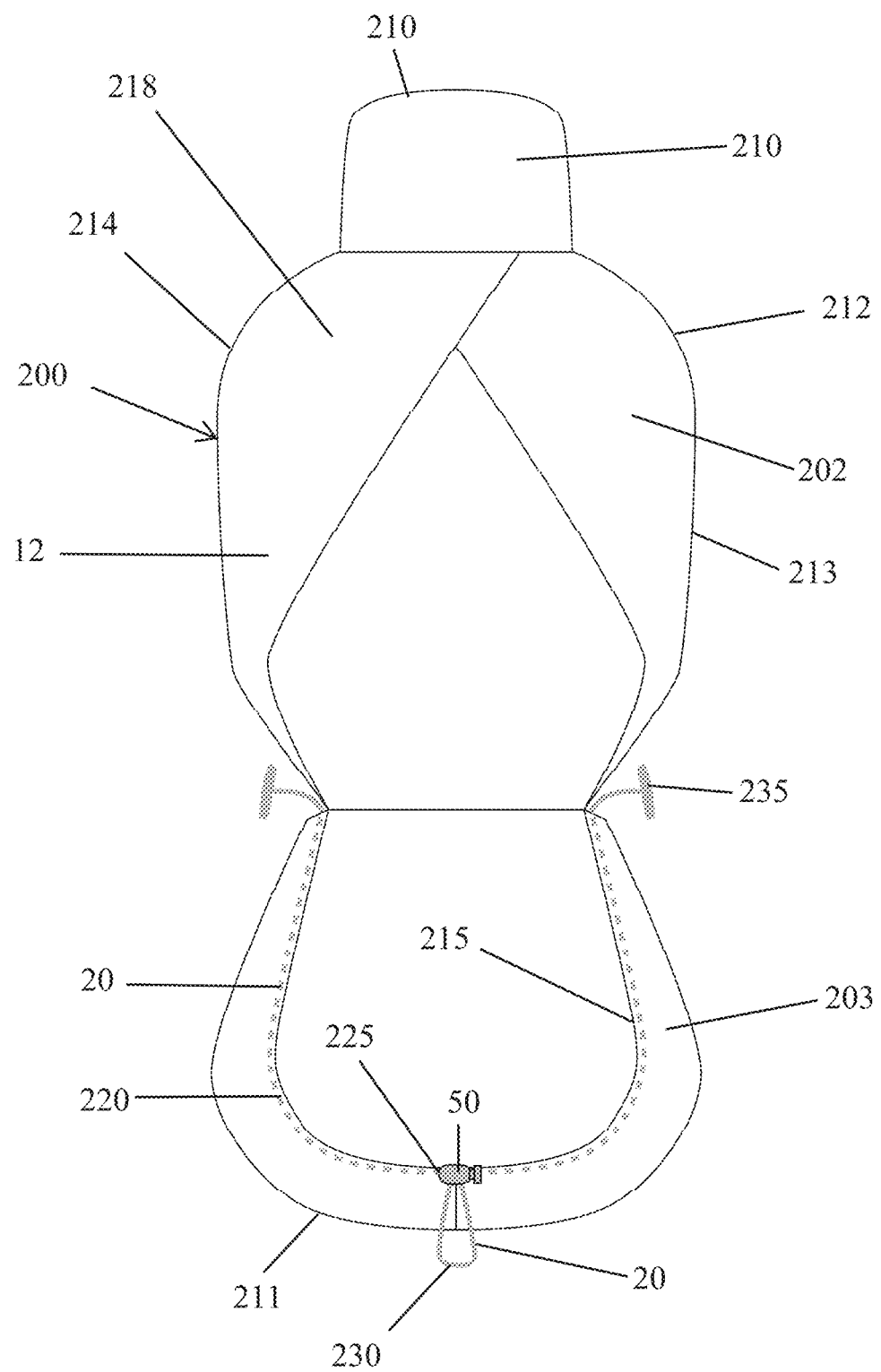
FIG. 5 is a rear view of the car seat and cover of FIG. 2.

The reference numbers in the drawings designate the following components of the present appliance:

| Component | Subcomponent | Reference Number |
|---|---|---|
| Cord | | 20 |
| Cord lock | | 50 |
| | barrel | 52 |
| | barrel opening | 55 |
| | plunger | 57 |
| Car seat cover | | 200 |
| | headrest portion | 201 |
| | back portion | 202 |
| | seat portion | 203 |
| | seam | 205 |
| | top | 210 |
| | bottom | 211 |
| | right side | 212 |
| | side seam | 213 |
| | left side | 214 |
| | bottom peripheral edge | 215 |
| | front | 216 |
| | back | 218 |
| | casing | 220 |
| | central casing opening | 225 |
| | loop end | 230 |
| | toggle | 235 |
| | back portion central panel | 244 |
| | car seat | 250 |
| | pouch | 270 |
| | pouch opening | 272 |

DETAILED DESCRIPTION

The terms "above," "below," "between," and other terms of relative position or orientation as used herein refer to a relative position of one layer with respect to other layers. As such, one layer deposited or disposed above or below another layer may be directly in contact with the other layer or may have one or more intervening layers, unless described otherwise herein.

"Car" refers to an automotive vehicle, for example an automobile or truck.

"Casing" refers to a hemmed or separately formed portion of material that forms a continuous or partially continuous tube through which a cord (such as a drawstring) can be threaded.

"Cord lock" refers to a small mechanism through which a length of cord passes and which can reversibly clamp onto the cord. Cord locks typically include a spring, a plunger and a barrel, with the plunger and spring disposed in the barrel. Cords typically pass through a hole in the plunger, and tension from the spring on the plunger is used to maintain a cord in place, though other designs can be used. A cord lock is sometimes also referred to as a cord toggle, cord fastener, or cinch.

"Laminate" refers to materials adhered or bonded to each other.

"Spandex" refers to long chain synthetic polyurethane/urea elastomers comprised of at least 85% by weight of segmented polyurethane in the form of fibers and films. Spandex can be made by mixing a macroglycol with a diisocyanate monomer, reacted with an equal amount of diamine, and diluted with a solvent. Such materials have a high shear strength and high elasticity, and are widely used in the textile industry.

"Thermoplastic polyurethane" and "TPU" refer to an elastic block copolymer consisting of alternating sequences of hard and soft segments or domains formed by the reaction of (1) diisocyanates with short-chain diols (so-called chain extenders) and (2) diisocyanates with long-chain diols. TPU includes polyester-based TPU, generally derived from adipic acid esters, and polyether-based TPU, derived from tetrahydrofuran (THF) ethers.

"Toggle" refers to a rigid crosspiece attached or fastened to the end of a cord, generally used to secure an item or component in place.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

Car Seat Cover

FIGS. 2-5 illustrate an embodiment of the present car seat cover 200 which includes a headrest portion 201, a back portion 202, a seat portion 203, seams 205, a top 210, a bottom 211, a right side 212, a left side 214, a front 216, a back 218, and a casing 220. The casing 220 has a cord 20 looped through and two toggles 235, one at each end. A loop end 230 of the cord 20 is preferably placed through a barrel opening 55 of a barrel portion 52 of a cord lock 50, the cord lock 50 further preferably including a plunger 57 which can be actuated to secure the cord lock 50 in place on the cord 20 through pressure exerted by the plunger 57 on the cord 20.

Typically, car seat covers which cover just the front of a car seat use a webbing buckle on the neck of the seat, with some kind of webbing or elastic buckle strap on the waist of the seat, and as a result installation of such seats requires that a user go back and forth between the front and back of the seat. Car seat covers which fully cover a seat also typically require effort to install, and the head rest portion is often a separate piece from the cover for the remainder of the seat in order to tightly conform to the shape of the car seat. The present car seat cover 200 however allows faster installation, thereby making it more convenient for removal and wash, such as when it is used after a user has exercised.

To install the present car seat cover 200, the headrest portion 201 is first placed over the headrest of a car seat 250. The seat portion 203 is then placed over the bottom seat portion of the car seat 250. A casing 220 is provided along a peripheral edge 215 on the bottom end 211 of the car seat cover 200, and the cord 20 is strung through the casing. The two toggles 235 secured to the longitudinal ends of the cord 20 are placed adjacent the right and left sides of the center seam of the car seat 250 (where the back and seat portions meet) and are then pulled in order to tighten the seat portion 203 of the car seat cover 200 around the front, bottom portion of the car seat. The toggles 235 are then tucked into the center seam of the car seat in order to secure them. Since the toggles 235 form a T shape with the cord 20 in a directional (perpendicular) manner, when each toggle is inserted into and preferably through the center seam of the car seat, it can be turned and locked behind the car seat cushion, i.e. in the rear portion of the car seat 250.

A loop end 230 of the cord 20 extends through a central casing opening 225 in a medial portion of the casing 220, and the loop end 230 is placed through a cord lock outside the casing. In order to tighten the seat portion 203 of the car seat cover 200 to the seat portion of the car seat 250, the loop end 230 can be pulled, and when a desired tension is achieved the extent of cord extending through the central casing opening 225 can be fixed with the cord lock 50.

Secure installation of the car seat cover 200 on a front portion of a car seat 250 can thus be assured through the use of the headrest cover portion 201 on the top end 210 in combination with the cord 20, toggles 235 and cord lock 50 in the seat portion 203 on the bottom end 211 of the car seat cover 200. These components are arranged so as to provide fixing points, namely the head rest portion 201 at the top, toggles 235 around the middle and sides, and the cord lock at the bottom. The use of such fixing points allows the present car seat cover 200 to remain securely in place without needing to be fully wrapped around a car seat.

The design of the present car seat cover 200 makes it compatible for car seats 250 with side airbags, since it does not need to extend across the back side of the back portion of a car seat, and because only the head and bottom portion of the car seat cover 200 are firmly secured to the car seat 250, allowing side airbags to break out. In one embodiment, the back portion 202 of the car seat cover 200 can be made from different pieces of material along the right and left sides 212, 214 joined by a side seam 213 to a central panel of material 244 extending between the right and left sides 212, 214 of the back portion 202. The side seam 213 of the seat cover 200 can be designed to rip and breaks open in order to allow airbags to come out.

Figure 6:
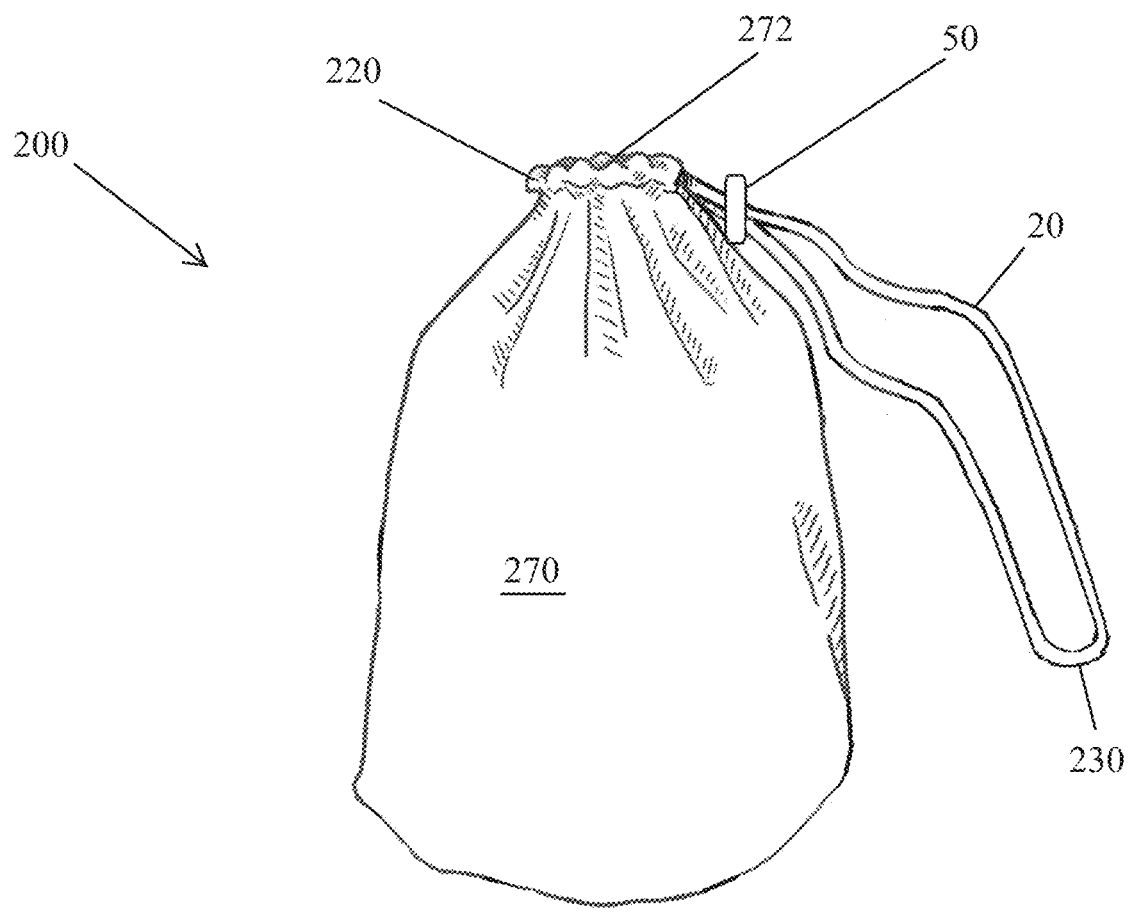
FIG. 6 is a side elevation view of a pouch enclosing the car seat cover of FIG. 2.

In one embodiment, when the car seat cover 200 is not secured onto a car seat, the cord lock 50 can be urged in a tightening direction away from the closed loop end 230, and the seat portion 203 of the seat cover can form a pocket or pouch 270, as shown in FIG. 6. A pouch opening 272 is formed by pushing the casing 220 away from the loop end 230. The remaining material of the car seat cover 200 can then be folded or otherwise urged past the pouch opening 272 into the pouch 270 in order to compactly contain the car seat cover 200.

Cover Material

Figure 7:
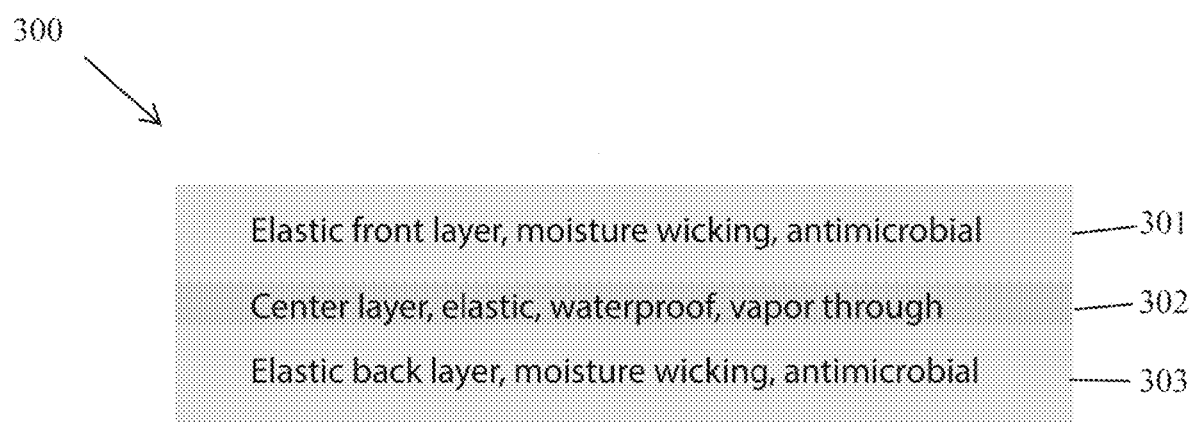
FIG. 7 is an illustration showing the layers in a material that can be used in the present vehicle seat covers.

The seat cover 200 is preferably made from a three-layer material 300 illustrated in FIG. 7. The first layer 301 is a wicking, antimicrobial material, the second layer 302 is an absorbent, waterproof material, and the third layer 303 is the same as the first layer. The second layer is sandwiched between the first and third layers, and the three layers are laminated together.

The material 300 is elastic, in order to allow it to achieve a more form-fitting conformation when a seat cover 10 is placed on a seat. The separate layers 301-303 therefore include or are formed from elastic materials such as spandex and thermoplastic polyurethane (TPU). For example, spandex can be included in the outer antimicrobial and moister-wicking layers 301, 303 and the middle layer 302 can be TPU. When using TPU, it is preferred for use in the middle layer in part because this protects it from peeling (delaminating) due to wear and tear. In one embodiment, the outer layers 301, 303 can be made from a material comprising approximately 88% polyester and 12% spandex (elastane). The spandex provides elasticity, and other materials, such as other synthetic materials, can be substituted for the polyester.

The outer layers 301, 303 are formed from a moisture-wicking, and fast-drying material. Moisture wicking helps absorb the sweat of a user, and the anti-microbial solution can help prevent unwanted odors. The inner later is preferably a waterproof film such as TPU (thermoplastic polyurethane). Other waterproof films can also be used, but elastic materials such as TPU are preferred.

The outer layers 301, 303 can be treated with an antimicrobial solution in order to make them antimicrobial. For example, AEGIS Microbe Shield material (made by the Microban Products Company, Huntersville, NC) can be applied as a coating to polymer materials such as urethane materials to form an antimicrobial layer, such as a cationic layer. In another embodiment, the polymer material of the outer layers 301, 303 can incorporate an antimicrobial additive, such as zinc or copper. These additives can comprise silver or zinc ions or compounds, for example SILVERSHIELD or ZPTECH materials (available from Microban) or SILVADUR material (available from Danisco USA Inc., New Century, KS).

The combination of the foregoing materials into a three-layer laminate that makes the laminated material suited for use as a seat cover which can absorb sweat, stay clean, and prevent the spread of germs. Lamination can be achieved in ways known to the art. In one embodiment, small dots of glue are placed on one or more of the materials 301-313, and these materials are then rolled together through a headed roller and pressed in order to bond them together, followed by cooling. Once bonded, the layers can't be separated without damaging the layers.

The various features and processes described above may be used independently of one another, or may be combined in various ways. All possible combinations and sub-combinations are intended to fall within the scope of this disclosure. Any reference to an element herein using a designation such as "first," "second," and so forth does not generally limit the quantity or order of those elements.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. The examples set forth herein are provided to illustrate certain concepts of the disclosure. The apparatus, devices, or components illustrated above may be configured to perform one or more of the methods, features, or steps described herein. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

Certain components (including layers, coatings, or other components) listed herein may be described as "comprising," "made of" "including," or similar such terms, a material or a combination of materials. In one aspect, each of those components may also consist of that material or the combination of materials. In another aspect, each of those components may also consist essentially of that material or the combination of materials.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A seat cover having a headrest portion 201, a back portion 202, a seat portion 203, a top 210, a bottom 211, a right side 212, a left side 214, a front 216, a back 218, and a casing 220,
   wherein the casing comprises a tubular enclosure secured to the bottom and extending from the right side 212 to the left side 214, wherein a cord 20 having a right side end and a left side end extends through the casing 220 between a right side and a left side of the casing, the cord having a right side toggle outside the right side of the casing and a left side toggle outside the left side of the casing,
   further comprising a cord lock 50, wherein a medial loop portion 230 of the cord 20 is placed through a barrel opening 55 of a barrel portion 52 of the cord lock 50.

2. The seat cover of claim 1, wherein the cord lock 50 further comprises a plunger 57 which can be actuated to secure the cord lock 50 in place on the cord 20 through pressure exerted by the plunger 57 on the cord 20.

3. The seat cover of claim 1, wherein the seat cover is made from a three-layer elastic material, and wherein the outer layers 301, 303 are moisture-wicking and the inner layer is waterproof.

\* \* \* \* \*